US00RE34874E

United States Patent [19]

Newman et al.

[11] E Patent Number: Re. 34,874

[45] Reissued Date of Patent: Mar. 14, 1995

[54] SEAL WITH TWO SEALING PORTIONS HAVING FLANGE RECEIVING OPENING THEREBETWEEN

[75] Inventors: Ira R. Newman, Apple Valley; Kenneth N. Minshull, Agoura; Kenneth J. McGilp, Adelanto, all of Calif.

[73] Assignee: Precision Tbe Bending, Inc., Santa Fe Springs, Calif.

[21] Appl. No.: 945,828

[22] Filed: Sep. 16, 1992

Related U.S. Patent Documents

Reissue of:

[64] Patent No.: 4,565,380
Issued: Jan. 21, 1986
Appl. No.: 673,581
Filed: Nov. 21, 1984

U.S. Applications:

[63] Continuation of Ser. No. 641,651, Jan. 15, 1991, abandoned.

[51] Int. Cl.[6] ..... F16J 15/12

[52] U.S. Cl. ..... 277/178; 277/166; 277/183; 277/205

[58] Field of Search ..... 277/178, 166, 183, 205, 277/207 A, 188 A, 227, DIG. 6; 285/231, 232

[56] References Cited

U.S. PATENT DOCUMENTS

| | | | |
|---|---|---|---|
| 727,242 | 5/1903 | White | 285/231 X |
| 1,988,652 | 1/1935 | Gardner | 277/48 |
| 2,049,801 | 8/1936 | Gage | 285/231 X |
| 2,213,116 | 8/1940 | Bernstein | 277/47 |
| 2,470,925 | 5/1949 | Frederickson . | |
| 2,480,116 | 4/1949 | Brummer | 277/178 X |
| 2,542,234 | 2/1951 | Chambers, Jr. | 277/47 |
| 2,587,405 | 2/1952 | Stevens et al. | 277/205 X |
| 3,409,357 | 8/1962 | Kosatka | 277/183 |
| 3,449,021 | 6/1969 | Palen | 277/183 X |
| 3,563,558 | 2/1971 | Doutt | 277/205 |
| 3,680,874 | 8/1972 | Schwarz | 285/231 X |
| 3,695,639 | 10/1972 | Shire et al. | 285/231 X |
| 4,111,441 | 9/1978 | Sick et al. | 277/183 |
| 4,219,204 | 8/1980 | Pippert | 277/188 A X |

FOREIGN PATENT DOCUMENTS

| | | | |
|---|---|---|---|
| 1039325 | 9/1958 | Germany | 277/152 |
| 1121891 | 1/1962 | Germany . | |
| 1958378 | 1/1967 | Germany . | |
| 2947083 | 5/1981 | Germany . | |
| 1015302 | 12/1965 | United Kingdom | 285/231 |

OTHER PUBLICATIONS

R. H. Warring: "Seals and Sealing Handbook", Jul. 1986, pp. 317–318.

*Primary Examiner*—William A. Cuchlinski, Jr.
*Assistant Examiner*—Scott W. Cummings
*Attorney, Agent, or Firm*—Joseph E. Mueth

[57] ABSTRACT

An integral ring-shaped seal adapted to be carried at the end of a connector housing and provide two spaced-apart sealing portions, said two spaced-apart sealing portions being connected by a web, and said two spaced-apart sealing portions together with said web providing therebetween an opening adapted to receive a flange located in proximity to the end of the connector housing, at least one of said two spaced-apart sealing portions having a cut-out axially disposed away from said opening to provide increased resiliency and wear resistance.

8 Claims, 9 Drawing Sheets

FIG. 1
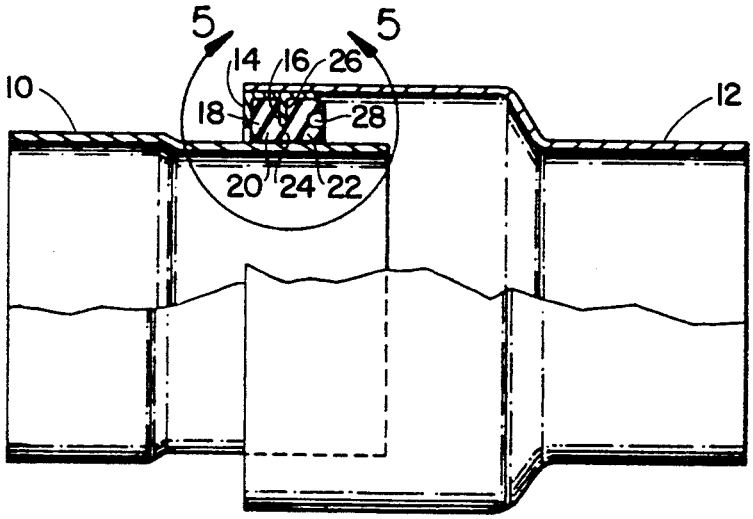
FIG. 2
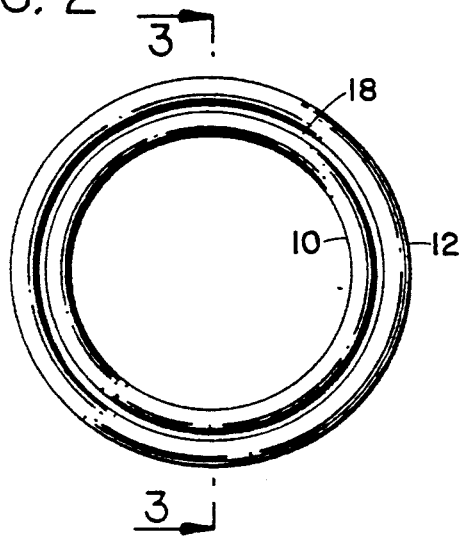
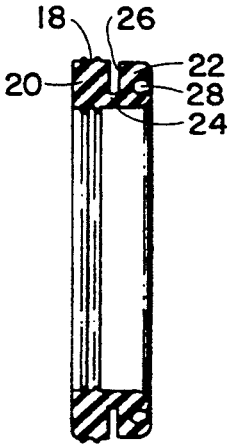
FIG. 3
FIG. 4
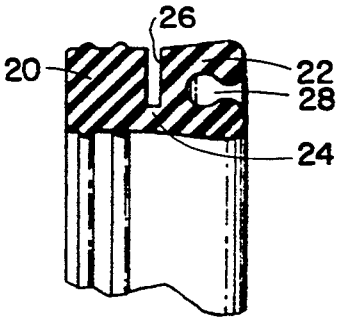
FIG. 5
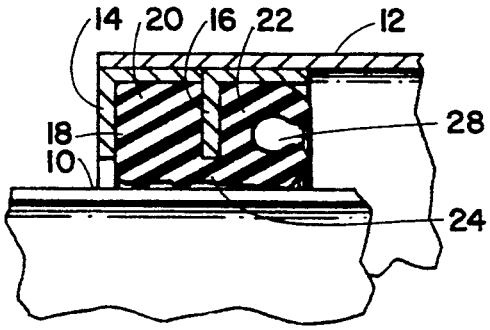

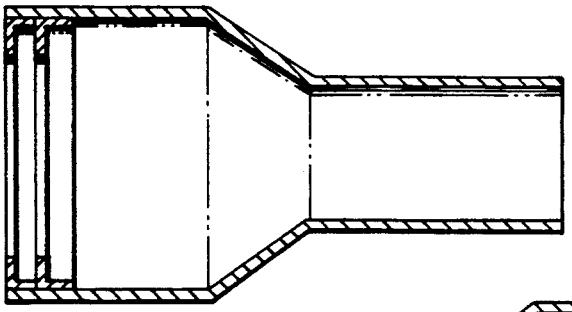
FIG.13A
FIG.13B
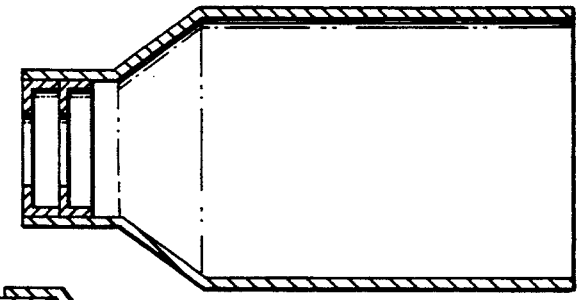
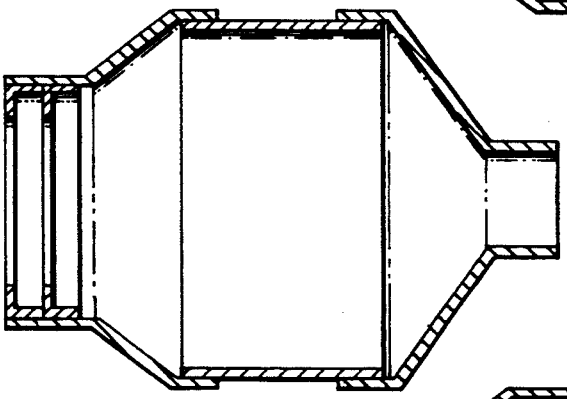
FIG.13C
FIG.13D
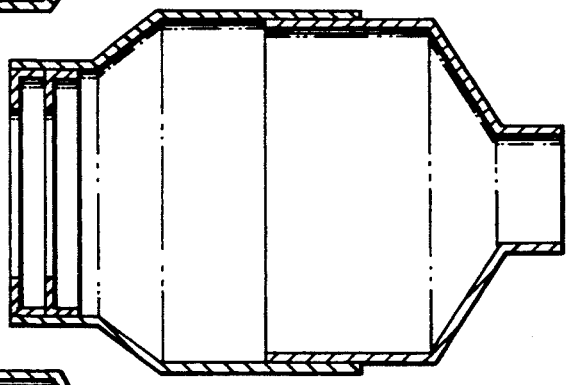
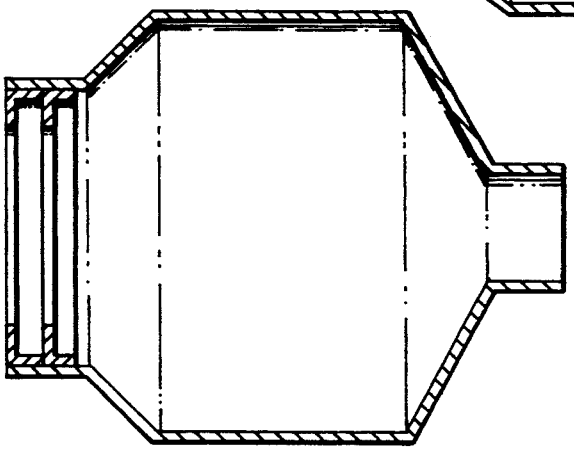
FIG.13E

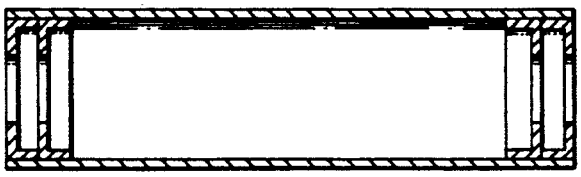
FIG.13F
FIG. 13G
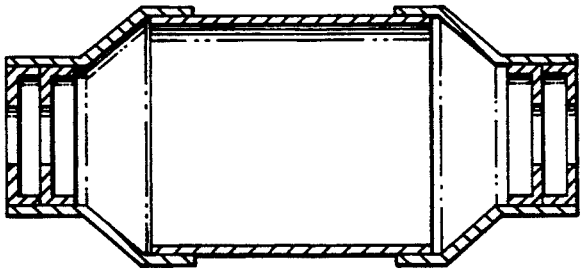
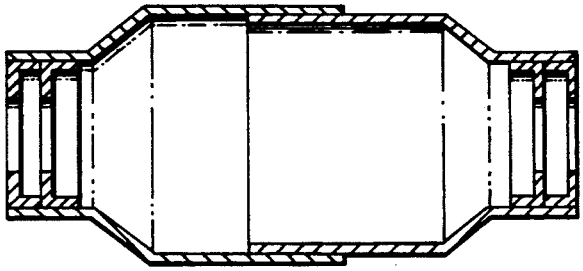
FIG.13H
FIG.13J
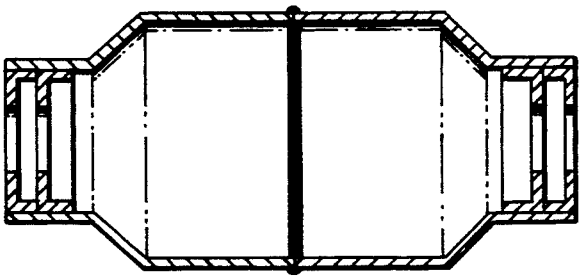
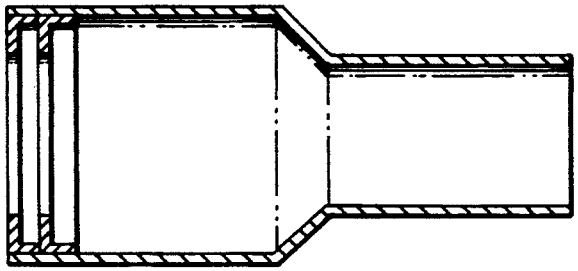
FIG.13K
FIG.13L
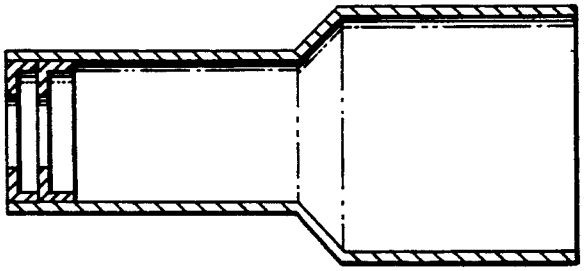

SEAL WITH TWO SEALING PORTIONS HAVING FLANGE RECEIVING OPENING THEREBETWEEN

Matter enclosed in heavy brackets [ ] appears in the original patent but forms no part of this reissue specification; matter printed in italics indicates the additions made by reissue.

*This is a continuation of application Ser. No. 07/641,651, filed on Jan. 1, 1991, now abandoned, which is reissue of 06/673,581, filed Nov. 21, 1984, and patented as U.S. Pat. No. 4,565,581, on Jan. 21, 1986.*

BACKGROUND OF THE INVENTION

Various ring seals for use at the end of connector housing have been used. Kramer U.S. Pat. No. 3,206,226 discloses an annular seal ring having radially inner and radially outer sides defining smoothly convex surfaces extending across the width thereof and convex axial sides forming a pair of radially outer corners and a pair of radially inner corners. Greenwald U.S. Pat. No. 3,698,727 pertains to a seal ring which in cross-section is essentially U-shaped or J-shaped and having an elastomeric or garter spring core. Kramer U.S. Pat. No. 3,918,726 relates to another flexible seal member having an insert membrane embodied therein to provide reinforcement of the balance of the flexible seal against deformation and resistance to abrasion. The disclosure of Shire and Newman U.S. Pat. No. 3,695,639 is characterized by two generally ring shaped cells mounted in spaced side by side relationship at the end of a connector housing. The outer seal is generally circular in cross-section and includes a first leg, and a second smaller leg connected together by a web portion. The end of the connector tube is provided with formations for holding the seals in the housing. These formations may include first and second counterbores for positioning the inner seal in the end of the connector housing. The base of the second counterbore is normally in spaced relation to the inner side of the second leg to permit the legs of the inner seal to flex when a pipe mounted in the connector pivots or vibrates.

The basic purposes of these annular rings is to maintain a tight seal over the wide range of temperatures and conditions encountered in use. The environment encountered is typically that found in the heating and air conditioning ducts of a modern commercial jet transport airplane. The individual lengths of connector tube are flexible due to thermal expansion and contraction, placing substantial and repeated stress on the ring seals.

The prior patents discussed above treat the problem of seal wear due to abrasion caused by repeated flexing in several ways. The seals of the Kramer patents lack sufficient flexibility and have been generally rejected for all practical purposes.

The other two patents endeavored to provide flexibility. However, the seals disclosed therein are rather complex in manufacture involving composite structures or a plurality of individual components. In any case, the complexity creates opportunity for error in manufacture and installation, as well as necessarily involving high cost.

The present invention for the first time presents an integral annular seal which provides excellent sealing, high flexibility and resistance to abrasion. The seal of this invention is simpler to make and install in a connector and is believed to represent a significant advance over the seals of the prior art. It is to be expected that this new seal will be widely adopted by the commercial jet transport industry.

SUMMARY OF THE INVENTION

Briefly, the present invention comprises an integral ring-shaped seal adapted to be carried at the end of a connector housing and provide two spaced-apart sealing portions, said two spaced-apart sealing portions being connected by a web, and said two spaced-apart sealing portions together with said web providing therebetween an opening adapted to receive a flange located in proximity to the end of the connector housing, at least one of said two spaced-apart sealing portions having a cut-out axially disposed away from said opening to provide increased resiliency and wear resistance.

This invention further comprehends the novel combination comprising telescoping connector housing sections one of which has an upstanding annular flange located in proximity to its open end, and an integral ring-shaped seal carried at the end of one of said connector housing, said seal having two spaced-apart sealing portions, said two spaced-apart sealing portions being connected by a web, and said two spaced-apart sealing portions together with said web providing therebetween an opening, said flange being received in said opening, at least one of said two spaced-apart sealing portions having a cut-out axially disposed away from said opening to provide increased resiliency and wear resistance.

Another feature of this invention is that the integral seal of this invention is held in position by one flange which is received in an opening of complementary size and shape within the seal, as stated above. Preferably, a second or end flange is also provided, as shown in the drawings. The flanges are "L" shaped and are usually welded to the connector wall. The length of the leg of either or both "L" shaped flanges abutting the connector wall can be cut to any size before welding and thereby adjust the space between flanges to accommodate any desired size of seal to vary the spacing between flanges. This features is highly desirable in providing a high degree of manufacturing flexibility and product variability from identical standard "L" shaped elements and is itself an improvement over the prior art.

It is an object of this invention to provide a novel annular ring seal.

It is a further object of this invention to provide an integral ring seal which is superior in manufacture and use than seals heretofore known in this art.

A related object of this invention is to provide a novel combination of connector sections and ring seal which is better adapted to manufacturing control and field use conditions.

These and other objects and advantages will be apparent to those skilled in the art from the more detailed description which follows, particularly when taken in conjunction with the accompanying drawings.

DESCRIPTION OF PREFERRED EMBODIMENTS

The following drawings are for purposes of illustration and further explanation.

Turning to the drawings:

FIG. 1 is a side sectional view of two telescoping ends of connector sections provided with one preferred embodiment of the novel integral annular seal of this invention, and is adapted to a ducting system which is in compression.

FIG. 2 is a plan view of the sealing ring shown installed in FIG. 1.

FIG. 3 is a section taken along line 3—3 in FIG. 2.

FIG. 4 is an enlarged view in section of the sealing ring of FIGS. 1 to 3.

FIG. 5 is a section taken along line 5—5 in FIG. 1.

FIGS. 6A through 6L are views similar to FIG. 4, showing a number of alternative embodiments of the ring seal of the present invention.

FIGS. 13A to 13L are partial sectional views of various connector ends provided with annular inwardly disposed flanges which are adapted to receive any of the sealing rings of FIGS. 1 through 12.

Figure 14:
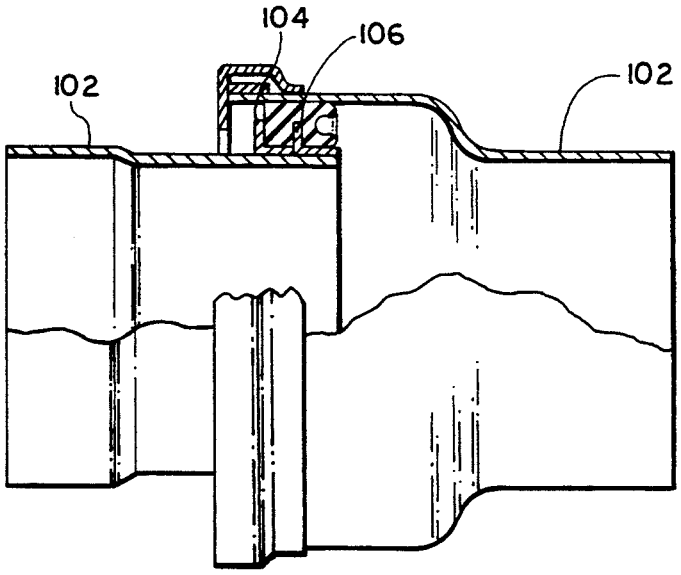

FIG. 14 and an ensuing Figures relate to important alternative embodiments of the invention wherein the annular flange is outwardly extending from the exterior of a connector section and the opening in the sealing ring is disposed so as to be able to receive an outwardly extending flange. FIG. 14 is a sectional view of one embodiment showing the sealing ring in the installed position, and is adapted to a ducting system which is in tension.

Figure 15:
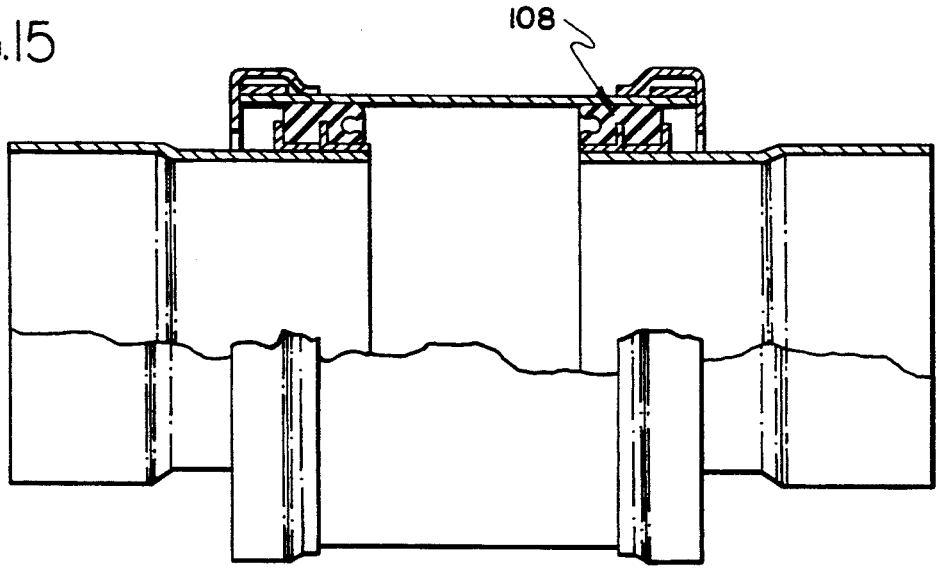

FIG. 15 shows in section another connector arrangement utilizing the sealing ring of FIG. 14.

Figure 16:
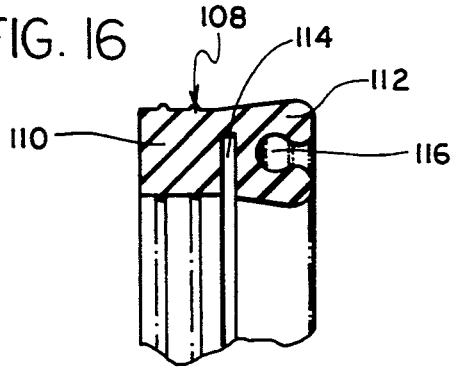

FIG. 16 is an enlarged partial section of the sealing ring of FIGS. 14 and 15.

Figure 17:
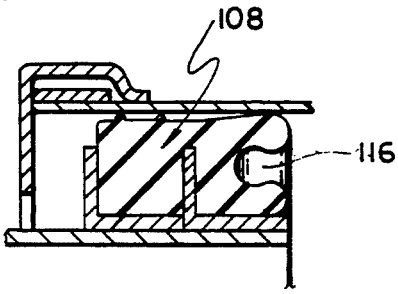
Figure 18A:
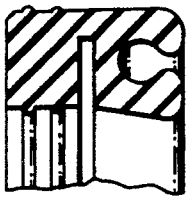
Figure 18B:
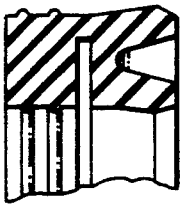
Figure 18C:
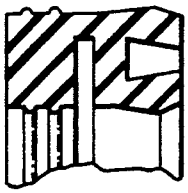
Figure 18D:
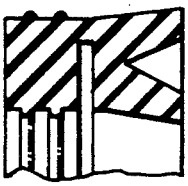
Figure 18E:
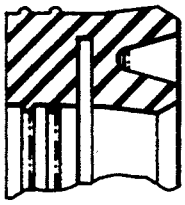
Figure 18F:
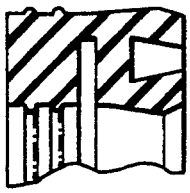
Figure 18G:
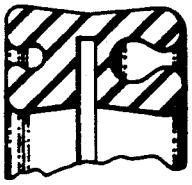
Figure 18H:
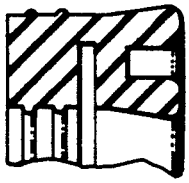
Figure 18J:
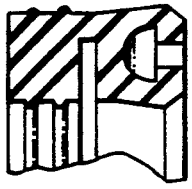
Figure 18K:
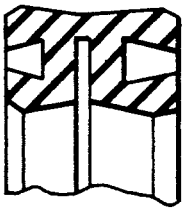
Figure 18L:
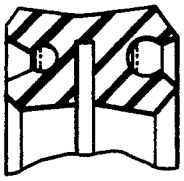

FIG. 17 is an enlarged partial section of the sealing ring of FIG. 16 which has been installed as per FIGS. 15 and 15.

FIGS. 18A through 18L are alternative embodiments in partial section of the sealing ring of FIGS. 14 to 17.

Figure 6A:
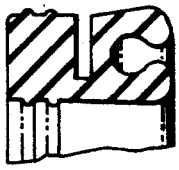
Figure 6B:
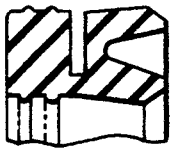
Figure 6C:
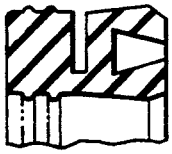
Figure 6D:
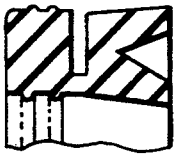
Figure 6E:
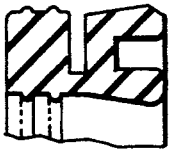
Figure 6F:
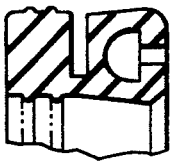
Figure 6G:
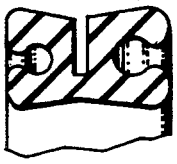
Figure 6H:
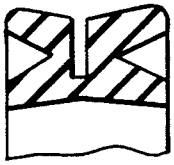
Figure 6J:
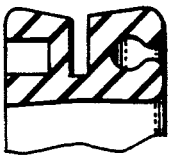
Figure 6K:
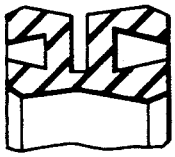
Figure 6L:
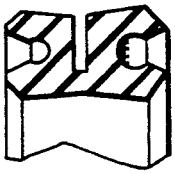
Figure 7:
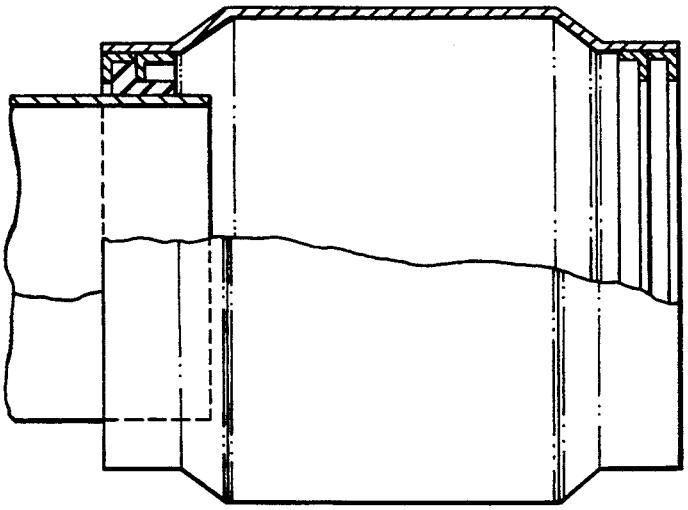
FIG. 7 is a sectional view of another embodiment of the present invention.
Figure 8:
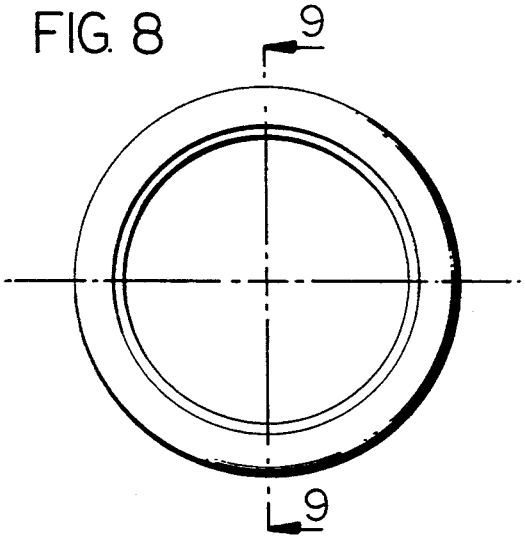
FIG. 8 is a plan view of the sealing ring shown as installed in FIG. 7.
Figure 9:
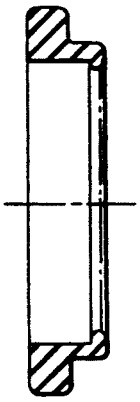
FIG. 9 is a sectional view taken along the line 9—9 in FIG. 8.
Figure 10:
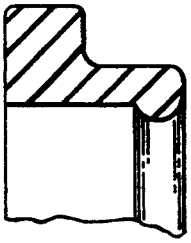
FIG. 10 is an enlarged view in section of the sealing ring of FIGS. 7 to 9.
Figure 11:
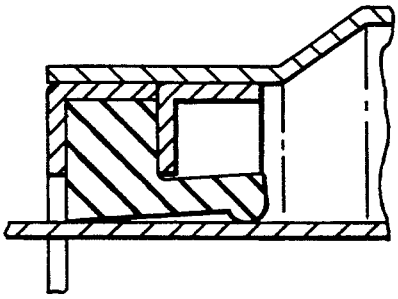
FIG. 11 is a greatly enlarged section showing the sealing ring and telescoping connector sections of FIG. 7.
Figure 12A:
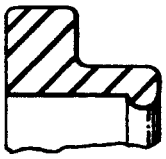
FIGS. 12A to 12H are alternate embodiments of the sealing ring of FIGS. 7 to 11.
Figure 12B:
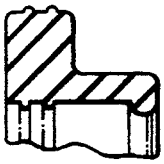
Figure 12C:
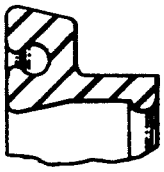
Figure 12D:
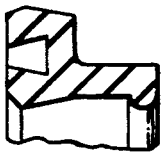
Figure 12E:
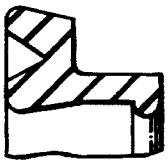
Figure 12F:
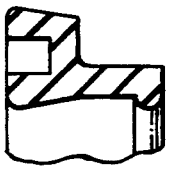
Figure 12G:
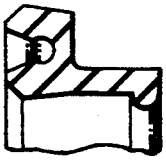
Figure 12H:
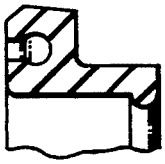
Figure 19:
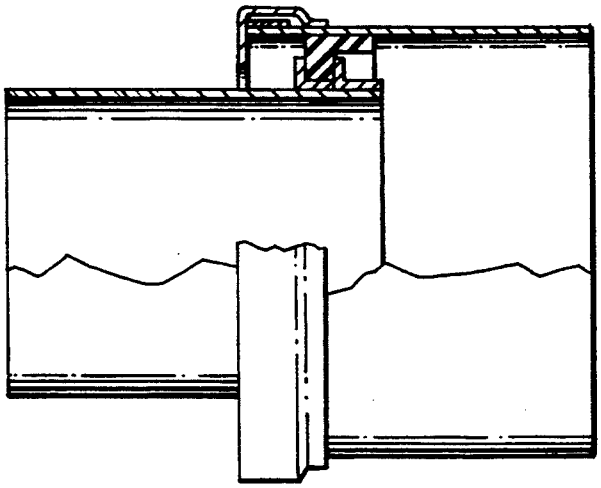

FIG. 19 is analogous to FIG. 7, differing in that the flange is outwardly rather than inwardly disposed on the connector end. FIG. 19 is a sectional view and shows another embodiment of this invention with the seal installed.

Figure 20:
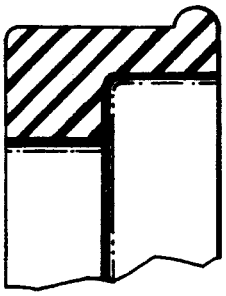

FIG. 20 is an enlarged partial section of the seal of FIG. 19.

Figure 21:
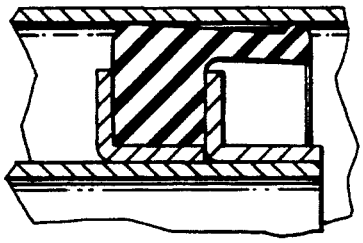
Figure 22A:
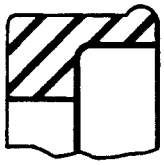
Figure 22B:
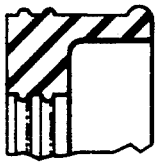
Figure 22C:
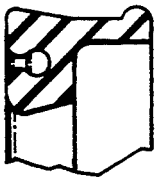
Figure 22D:
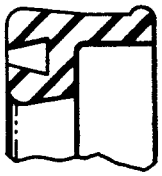
Figure 22E:
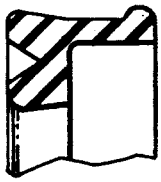
Figure 22F:
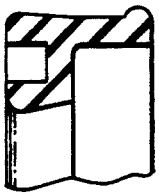
Figure 22G:
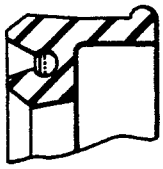
Figure 22H:
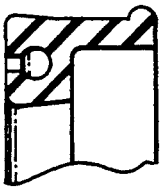

FIG. 21 shows the seal, in partial enlarged section, of FIGS. 19 and 20, installed.

FIGS. 22A through 22H are alternate embodiments in partial section of the seal of FIGS. 19 through 21.

Considering the drawings in more detail, and using the embodiment of FIGS. 1 to 5 for purposes of illustration, connector end sections 10 and 12 telescope together as shown. Section 12 has two inwardly directed annular flanges 14 and 16 which are affixed to the body of section 12. The integral annular sealing ring 18 has two spaced-apart portions 20 and 22 interconnected by web 24. The opening 26 receives the flange 16. The portion 22 has a cut-out 28 which is axially disposed from opening 26.

When installed, the portion 22 is more resilient and flexible than portion 24 due to the presence of cut-out 28. The integral ring 18 is composed of an elastomer which is reinforced with a fiberous or filamentary material such as fiberglass. The entire ring 18 can be made in one molding operation. The engagement of flange 16 with opening 26 maintains the ring 18 in the proper position within the connector end over virtually any and all ranges of operating conditions. This structure has been found to be uniquely [resistance] *resistant* of abrasion and wear as the connector ends 10 and 12 [intergo] *undergo* flex due to thermal cycling and other stresses. The connector portions per se are normally made of titanium. However, the specific materials of construction do not bear on the present invention.

As can be seen in FIGS. 6A to 6L, the integral annular seal can have a variety of cross-sectional configurations including the embodiment wherein both portions which are interconnected by the web have axially disposed cut-out at opposite sides of the flange-receiving opening. The symmetrical configurations afford greater flexibility than the asymmetrical configurations.

The embodiments of FIGS. 7 to 12 illustrate the case where the flange-receiving opening and the axially displaced cut-out merge to form an L-shaped integral annular ring which has one leg adapted to abut the flange and the other leg adapted to abut the surface of one connector end on one of its sides and the free end of the flange on the other side.

The "L" shaped seal of FIGS. 7 through 12 is the same seal as shown in FIGS. 19 through 22. Thus, this version is characterized by exceptional versatility. It should also be noted that this seal affords far greater sealing area than the "J" seals of the prior art, and is superior in function and durability.

FIGS. 14 through 22 relate to the structure wherein the connector ends 100 and 102 are telescoping. Connector end 100 has outwardly disposed flanges 104 and 106. The integral annular seal 108 has two spaced-apart portions 110 and 112 with interconnecting web 112. The space 114 is adapted to receive flange 106. The axially disposed cut-out 116 functions as described hereinabove.

As is illustrated by FIG. 15 in particular, the invention is applicable to the full range of connector configurations.

The present invention provides numerous advantages some of which are as follows:

1. Longer sealing edge surface which provides longer service life.
2. Maintains its sealing capabilities under angulation and negative pressure.
3. Construction allows greater side loads.
4. Seal will not roll during installation.
5. Even if seal is installed beyond its design limits the web prevents the inner seal from disintegrating into the ducting system.
6. Design does not allow seal to be put into housing incorrectly.
7. Single seal design eliminates human error of omitting inner seal during installation.
8. "C" area of seal will accommodate "O" ring for additional squeeze if required, such as in cold air ducting.
9. Only required to stock one seal per joint, which is more cost effective resulting in less inventory.

10. Dimensionally the joint is used in a compression and tension system by changing the primary sealing surface of the seal from the housing to the sleeve.

It is to be understood that the present invention allows the use of the same general configuration of telescoping parts to be used in a compression or tension system, or a system that is mixed compression and tension.

It is also to be understood that the connector can be used as an integral part of a duct or separately as a reducer.

Having fully described the invention, it is intended that it be limited only by the lawful scope of the appended claims.

We claim:

[1. An integral ring-shaped seal adapted to be carried at the end of a connector housing and provide two spaced-apart sealing portions, said two spaced-apart sealing portions being connected by a web, and said two spaced-apart sealing portions together with said web providing therebetween an opening adapted to receive a flange located in proximity to the end of the connector housing, at least one of said two spaced-apart sealing portions having a cut-out axially disposed away from said opening to provide increased resiliency and wear resistance.]

[2. The construction of claim 1 wherein said opening is a slot.]

[3. The construction of claim 1 wherein there are two symmetric axial cut-outs which open at opposite sides of the seal.]

[4. The construction of claim 1 wherein there is one axial cut-out.]

[5. The novel combination comprising telescoping connector housing sections one of which has an upstanding annular flange located in proximity to its open end, and an integral ring-shaped seal carried at the end of one of said connector housing, said seal having two spaced-apart sealing portions, said two spaced-apart sealing portions being connected by a web, and said two spaced-apart sealing portions together with said web providing therebetween an opening, said flange being received in said opening, at least one of said two spaced-apart sealing portions having a cut-out axially disposed away from said opening to provide increased resiliency and wear resistance.]

[6. The construction of claim 5 wherein the seal has an L-shaped cross-section, one leg of which abuts the side of the flange and the other leg abuts the surface of one of its sides and the end of the flange on the other.]

[7. The construction of claim 5 wherein said opening is a slot.]

[8. The construction of claim 5 wherein there are two symmetric axial cut-outs which open at opposite sides of the seal.]

[9. The construction of claim 5 wherein there is one axial cut-out.]

[10. The construction of claim 5 where one of said telescoping sections has two adjacent "L" shaped flange sections, one of which is received in said opening in the seal and the other positioned to abut the end of said seal, both of said flange sections being adhered to the cylindrical surface of said telescoping section.]

[11. The construction of claim 10 wherein the flanges are on the interior of said telescoping section.]

[12. The construction of claim 10 wherein the flanges are on the exterior of said telescoping section.]

*13. In the ducts of commercial jet aircraft, the improvement comprising:*

*a novel combination forming part of said ducts and comprising telescoping flexible connector housing sections one of which has an upstanding annular flange located in proximity to the open end of the connector housing, and an integral, flexible, fiber-reinforced elastomeric ring-shaped seal carried at the end of one of said connector housing, said seal having two spaced-apart sealing portions, said two spaced-apart sealing portions being connected by a web, and said two spaced-apart sealing portions together with said web providing therebetween an opening, said flange being received in said opening, at least one of said two spaced-apart sealing portions having a cut-out axially disposed away from said opening to provide increased resiliency and wear resistance, said connector housing sections being adapted to undergo flex due to thermal cycling and other stresses.*

*14. The improvement of claim 13, wherein the seal has an L-shaped cross-section, one leg of which abuts the side of the flange and the other leg abuts the surface of one of its sides and the end of the flange on the other.*

*15. The improvement of claim 13, wherein said opening is a slot.*

*16. The improvement of claim 13, wherein there are two symmetric axial cut-outs which open at opposite sides of the seal.*

*17. The improvement of claim 13, wherein there is one axial cut-out.*

*18. The improvement of claim 13, wherein one of said telescoping sections has two adjacent "L" shaped flange sections, one of which is received in said opening in the seal and the other positioned to abut the end of said seal, both of said flange sections being adhered to the cylindrical surface of said telescoping section.*

*19. The improvement of claim 18, wherein the flanges are on the interior of said telescoping section.*

*20. The improvement of claim 18, wherein the flanges are on the exterior of said telescoping section.*

* * * * *